US011956403B1

(12) United States Patent
Kailey et al.

(10) Patent No.: US 11,956,403 B1
(45) Date of Patent: Apr. 9, 2024

(54) EDGE ENHANCEMENT WITH COMPENSATION MECHANISM

(71) Applicants: Walter F. Kailey, Boulder, CO (US); Claudiu Attila Balogh, Boulder, CO (US); Mikel Stanich, Boulder, CO (US)

(72) Inventors: Walter F. Kailey, Boulder, CO (US); Claudiu Attila Balogh, Boulder, CO (US); Mikel Stanich, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/181,614

(22) Filed: Mar. 10, 2023

(51) Int. Cl.
*H04N 1/00* (2006.01)
*H04N 1/405* (2006.01)
*H04N 1/52* (2006.01)

(52) U.S. Cl.
CPC ............ *H04N 1/4052* (2013.01); *H04N 1/52* (2013.01)

(58) Field of Classification Search
None
See application file for complete search history.

(56) References Cited

U.S. PATENT DOCUMENTS

| 8,764,151 | B2 | 7/2014 | Mantell |
| 9,609,171 | B2 | 3/2017 | Sagimori |
| 11,233,921 | B2 | 1/2022 | Yamada |
| 11,247,482 | B2 | 2/2022 | Nakagawa et al. |
| 11,456,220 | B2 | 9/2022 | Vronsky et al. |
| 11,630,975 | B1 * | 4/2023 | Terrab .............. G03G 15/0105 358/1.4 |
| 2004/0190030 | A1 | 9/2004 | Foster et al. |
| 2017/0310851 | A1 | 10/2017 | Dobashi |
| 2018/0241909 | A1 | 8/2018 | Walton |
| 2021/0090218 | A1 * | 3/2021 | Ernst ................. G06F 18/23 |

(Continued)

FOREIGN PATENT DOCUMENTS

JP 2022022878 2/2022

OTHER PUBLICATIONS

Feng et al., "A New Edge Enhancement on Halftone Image", 4 pages, Institution of Computer Science & Technology, Peking University, Beijing, CN, 100871.

(Continued)

*Primary Examiner* — Henok Shiferaw
(74) *Attorney, Agent, or Firm* — Jaffery Watson Mendonsa & Hamilton LLP

(57) ABSTRACT

A system is disclosed. The system includes at least one physical memory device to store edge enhancement logic and one or more processors coupled with the at least one physical memory device to execute the edge enhancement logic to receive a plurality of pels in a continuous tone image (CTI), receive compensation data for pel forming elements associated with each of the plurality of pels, receive edge enhancement transfer functions, determine whether each of the plurality of pels is an edge pel, perform edge enhancement processing for each of the determined edge pels, including generating a final pel value for the pel based on the pel value for the pel, the edge enhancement transfer function associated with the pel, and the compensation data associated with the pel and perform compensation processing for each of the determined not edge pels, including generating a final pel value for the pel based on the pel value for the pel, and the compensation data associated with the pel.

20 Claims, 17 Drawing Sheets

(56) References Cited

U.S. PATENT DOCUMENTS

| | | | |
|---|---|---|---|
| 2021/0099613 A1* | 4/2021 | Morovic | H04N 1/4052 |
| 2022/0088920 A1 | 3/2022 | Hayashi | |
| 2022/0288945 A1* | 9/2022 | Kailey | B41J 2/2146 |
| 2023/0120258 A1* | 4/2023 | Stanich | H04N 1/4015 |
| | | | 347/15 |
| 2023/0283737 A1* | 9/2023 | Stanich | H04N 1/00034 |
| | | | 358/1.1 |

OTHER PUBLICATIONS

Notice of Allowance for U.S. Appl. No. 18/181,608, 11 pages, dated Dec. 20, 2023.

\* cited by examiner mult_array(:,:,1) =

254 230 90 16 2 25 82 222
247 214 132 41 8 58 156 189
99 148 181 140 74 123 173 107
33 66 165 206 239 197 115 49
2 25 82 222 255 230 90 16
8 58 156 189 247 214 132 41
74 123 173 107 99 148 181 140
239 197 115 49 33 66 165 206 mult_array(:,:,2) =

252 228 88 14 1 22 80 219
244 211 129 38 5 55 154 186
96 145 178 137 71 121 170 104
30 63 162 203 236 195 112 47
1 22 80 219 252 228 88 14
5 55 154 186 244 211 129 38
71 121 170 104 96 145 178 137
236 195 112 47 30 63 162 203 mult_array(:,:,3) =

250 225 85 11 0 19 77 217
241 208 126 36 3 52 151 184
93 143 175 134 69 118 167 101
27 60 159 200 233 192 110 44
0 19 77 217 250 225 85 11
3 52 151 184 241 208 126 36
69 118 167 101 93 143 175 134
233 192 110 44 27 60 159 200

```
0  0  0  1  0  0  0  0      254 230  90  16   2  25  82 222      254 230  90   5   2  25  82 222
0  0  0  1  0  0  0  0      247 214 132  41   8  58 156 189      247 214 132  12   8  58 156 189
0  0  0  0  1  0  0  0       99 148 181 140  74 123 173 107       99 148 181 140  22 123 173 107
0  0  0  0  0 (1) 0  0       33  66 165 206 239(197)115  49       33  66 165 206 239(59)15  49
0  0  0  0  0  1  1  1        2  25  82 222 255 230  90  16        2  25  82 222 255  89  27   5
0  0  0  0  0  0  0  0        8  58 156 189 247 214 132  41        8  58 156 189 247 214 132  41
0  0  0  0  0  0  0  0       74 123 173 107  99 148 181 140       74 123 173 107  99 148 181 140
0  0  0  0  0  0  0  0      239 197 115  49  33  66 165 206      239 197 115  49  33  66 165 206

304                            305                                 306
```

```
0  0  0 65 65 65 65 65        254 230  90   5   2  25  82 222        0 0 0 1 1 1 0 0
0  0  0 65 65 65 65 65        247 214 132  12   8  58 156 189        0 0 0 1 1 1 0 0
0  0  0  0 65 65 65 65         99 148 181 140  22 123 173 107        0 0 0 0 1 1 0 0
0  0  0  0  0(65)65 65         33  66 165 206 239(59) 15  49         0 0 0 0 0(1) 0 1
0  0  0  0  0 65 65 65          2  25  82 222 255  69  27   5        0 0 0 0 0 0 1 1
0  0  0  0  0  0  0  0          8  58 156 189 247 214 132  41        0 0 0 0 0 0 0 0
0  0  0  0  0  0  0  0         74 123 173 107  99 148 181 140        0 0 0 0 0 0 0 0
0  0  0  0  0  0  0  0        239 197 115  49  33  66 165 206        0 0 0 0 0 0 0 0

307                              308                              309
```

EDGE ENHANCEMENT WITH COMPENSATION MECHANISM

FIELD OF THE INVENTION

The invention relates to the field of image reproduction, and in particular, to image processing.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

SUMMARY

In one embodiment, a system is disclosed. The system includes at least one physical memory device to store edge enhancement logic and one or more processors coupled with the at least one physical memory device to execute the edge enhancement logic to receive a plurality of pels in a continuous tone image (CTI), receive compensation data for pel forming elements associated with each of the plurality of pels, receive edge enhancement transfer functions, determine whether each of the plurality of pels is an edge pel, perform edge enhancement processing for each of the determined edge pels, including generating a final pel value for the pel based on the pel value for the pel, the edge enhancement transfer function associated with the pel, and the compensation data associated with the pel and perform compensation processing for each of the determined not edge pels, including generating a final pel value for the pel based on the pel value for the pel, and the compensation data associated with the pel.

BRIEF DESCRIPTION OF THE DRAWINGS

A better understanding of the present invention can be obtained from the following detailed description in conjunction with the following drawings, in which.

DETAILED DESCRIPTION

Prior to commencing printing operations, uniformity compensation may be performed to compensate for measured response differences for a print head nozzle which is not jetting properly. Compensation methods are based on uniformity compensation of nozzles, which comprises modifying (e.g., adjusting, lowering or raising) halftone thresholds proportional to a nozzle's intrinsic density (e.g., lower threshold results in a higher density).

However, various nozzles may become defective during printer operation, which may lead to undesired changes in jetting output (e.g., ink deposition artifacts such as jet-outs or deviated jets) caused by the defective nozzles. Thus, jet-out compensation is performed to lower the halftone thresholds of nozzles that are adjacent to the defective nozzle (or neighboring nozzles) and disabling the jet-out column of the defective nozzle to avoid unintentionally cleaning and activating the defective nozzle, which may create undesirable density variations in the printed output.

Edge enhancement may also be performed to enhance edge contrast of data to enhance print quality of images that are to be printed. Edge enhancement involves detecting edge pixels in a continuous tone image and performing an edge pixel specific halftoning operation on the detected pixels. However, edge enhancement may negate the results of the uniformity compensation and jet-out compensation processes.

According to one embodiment, an edge enhancement mechanism to maintain uniformity compensation and jet-out compensation of nozzles during edge enhancement is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
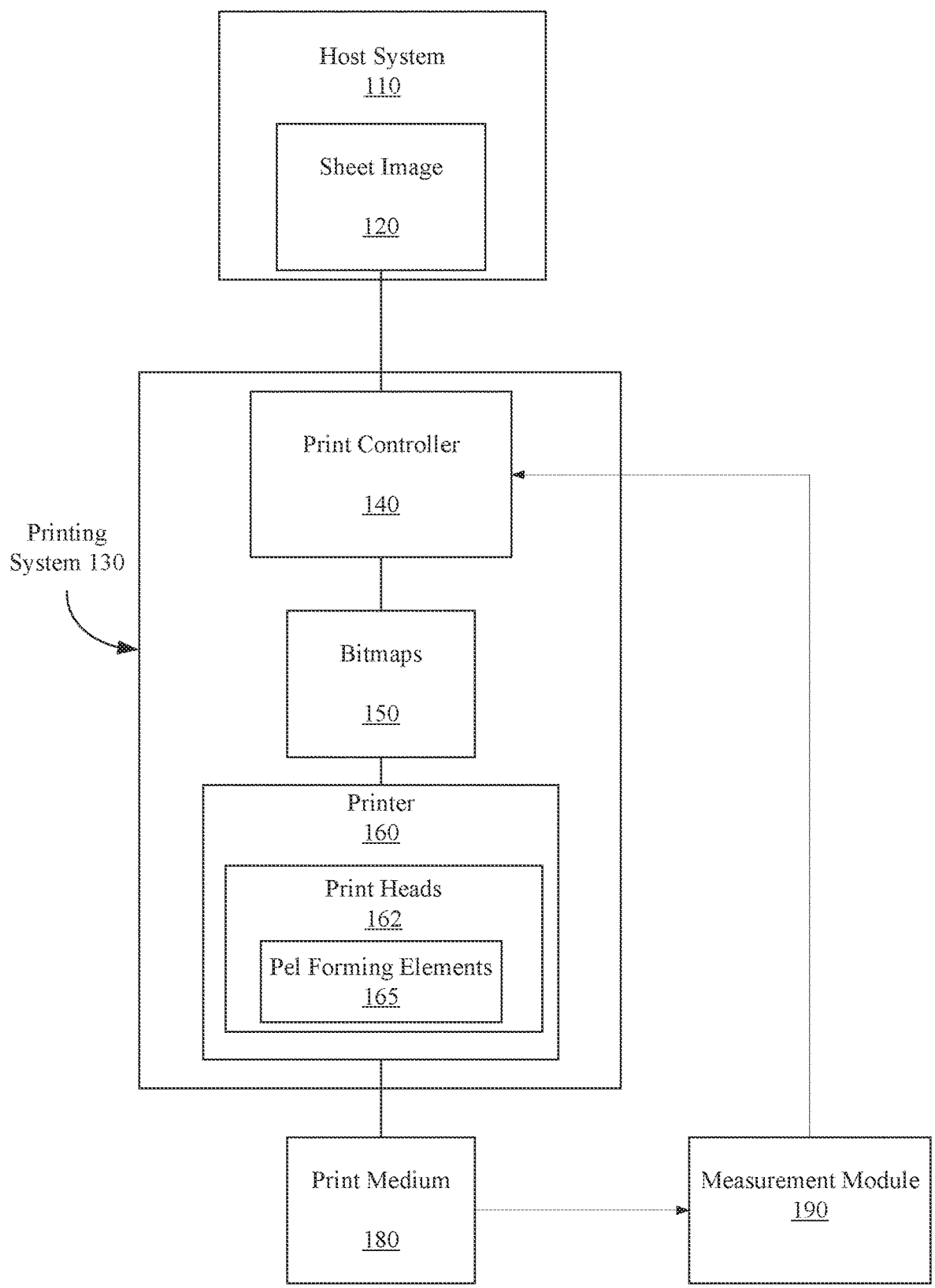
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. Further, the pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for the one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a compensation system to obtain measurements of the printed medium 180. The measured results are communicated to print controller 140 to be used in a compensation process. The measurement system may be a stand-alone process or be integrated into the printing system 130.

According to one embodiment, measurement module 190 may be a sensor to take measurements of printed images on print medium 180. Measurement module 190 may generate and transmit measurement data 222. Measurement data 222 may be OD (e.g., optical density), perceptual lightness (e.g., L* in the CIELAB color plane L*a*b*) and/or scanned image (e.g., RGB) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer, or spectrophotometer.

In a further embodiment, measurement data 222 may include map information to correlate portions of the measurement data to the corresponding pel forming elements 165 that contributed to the printing of the portions of the measurement data. In another embodiment, the print instructions for a test chart (e.g., step chart or test master) along with the known printer design provides the correlation (e.g., mapping) of the portions of the measurement data 222 to the corresponding pel forming elements 165 that contributed to the printing of the portions of the measurement data.

Figure 2:
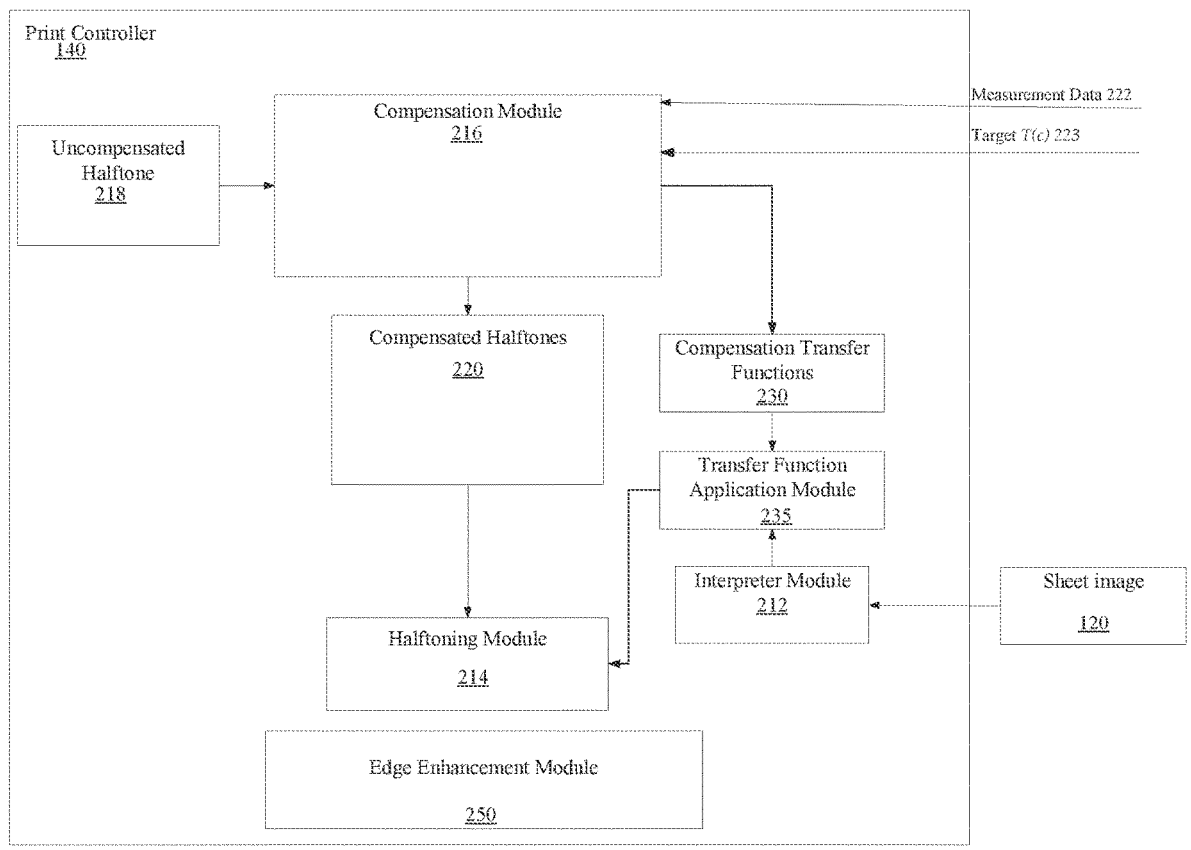
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a compensation module 216. These separate components may represent hardware used to implement the print controller 140. Alternatively, or additionally, the separate components may represent logical blocks implemented by executing software instructions in a processor of the printer controller 140.

Interpreter module 212 is operable to interpret, render, rasterize, or otherwise convert images (e.g., raw sheetside images such as sheet image 120) of a print job into sheetside bitmaps (e.g., contone images). The sheetside bitmaps generated by the interpreter module 212 for each primary color are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image. Interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data as a part of the image processing prior to printing. In that case, CTI is transformed by the transfer functions prior to halftoning.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger instructed drop sizes, beginning with zero and ending with a maximum drop size (e.g., none, small, medium and or large). The halftone design may be implemented as threshold arrays (e.g., halftone threshold arrays) such as single bit threshold arrays or multibit threshold arrays). In another embodiment, the halftone design may include a three-dimensional look-up table with all included gray level values.

In a further embodiment, halftoning module 214 performs the multi-bit halftoning using the halftone design comprising a set of threshold values for each pel in the sheetside bitmap, where there is one threshold for each non-zero ink drop size. The pel is halftoned with the drop size corresponding to threshold values for that pel. The set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone pel values in the sheetside bitmap.

This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than, less than, or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

Figure 3A:
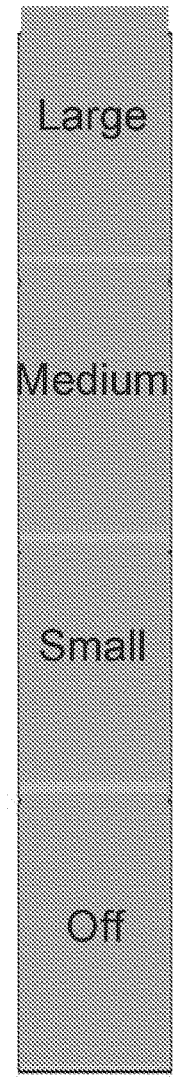
FIG. 3A illustrates one embodiment of multibit halftone designs, where the halftones are described using multi-bit threshold arrays (MTAs)

For multi-bit halftones, as shown in FIG. 3A, the MTA is a three-dimensional array including one two-dimensional array for each drop size transition. Thus, an MTA includes a set of two-dimensional arrays of thresholds for transition between drop sizes: plane one provides the threshold for the Large output level, while plane 2 and plane 3 provide thresholds for the Medium and Small output levels respectively for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold data on a pel basis. In one embodiment, halftoning module 214 produces Large drops when the image contone data is greater than the respective large threshold values in plane 1.

Medium drops are produced when the image data is greater than the medium drop plane 2 thresholds and the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined, based on the contone values.

Alternate versions of the halftoning equations may also be defined. An example of an alternate set of halftoning logical expressions replaces the less-than-or-equal-to operation with less-than and replaces the greater-than operation is replaced with greater-than-or equal-to. A further variation of halftoning uses only the greater-than logical expressions starting with the test for the largest drop size first. The large drop is emitted if the continuous tone (e.g., 8-bit) value is greater than the large drop transition threshold for the pixel being tested. If a drop size is determined by this test, no more tests are performed. If a drop size is not found the process continues with the logical expression for the next smaller drop size. If the sequential test for each drop size does not find any drop size, the none drop size is assumed. The threshold arrays for each different set of halftoning equations will vary, and therefore the threshold arrays generated correspond to a given set of equations.

In other embodiments, the number of planes of threshold data may be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

Compensation module 216 performs a compensation process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones. In one embodiment, an un-compensated halftone 218 represents a reference halftone design that is modified to create the compensated halftones. In such an embodiment, measurements of the system response (e.g., measurement data 222) for a printed test chart are received via measurement module 190 using the un-compensated halftone 218 for printing a test chart.

Compensation module 216 also performs a compensation process to generate compensation transfer functions 230. Compensation transfer functions 230 are then received at transfer function application module 235. Transfer function application module 235 applies the received compensation transfer functions 230 to print image data received from interpreter module 212 prior to performing halftoning at halftoning module 214. In one embodiment, a transfer function comprises a mapping of an input digital count (or tint) to an output digital count for a system, where digital count is the gray level or color value representing the pels in a bitmap 150 (FIG. 1). Transfer functions may be received or generated (e.g., generated based on target OD (e.g., target T(c) 223) versus input digital count data and measured OD versus output digital count data (e.g., measurement data 222).

According to one embodiment, compensation module 216 may also be implemented to perform artifact (e.g., jet-out, deviated jet, etc.) compensation for defective pel forming elements 165. As used herein, a jet-out is a print defect (e.g., pel forming element artifact) caused by a completely blocked ink jet nozzle and the result is no ink deposited on the print medium when the blocked ink jet nozzle is instructed to fire. A deviated jet is a print defect (e.g., pel forming element artifact) caused by a partially blocked ink jet nozzle and the result is ink drops deposited on the print medium when the ink jet nozzle is instructed to fire, but the ink drops are deposited in positions on the print medium that deviate significantly from the nominal deposition position of an unblocked ink jet nozzle.

Figure 4:
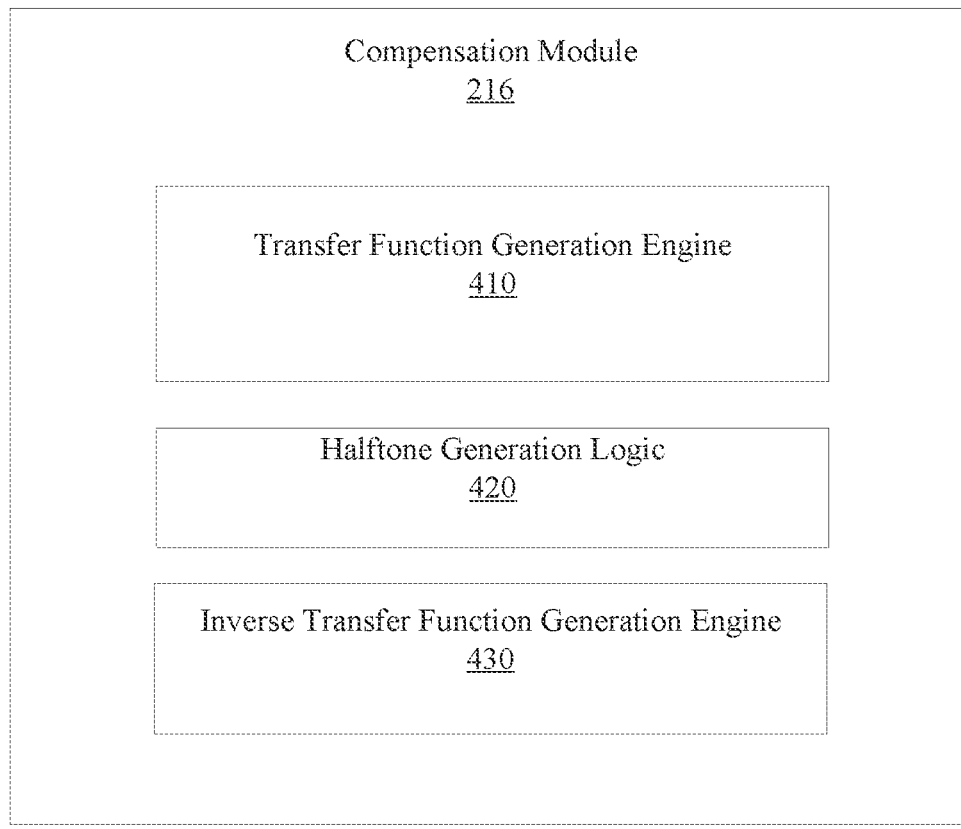
FIG. 4 illustrates one embodiment of a compensation module.

FIG. 4 illustrates one embodiment of compensation module 216. As shown in FIG. 4, compensation module 216 includes a transfer function generation engine 410 that is used to perform compensation by generating a uniformity compensation transfer function for each color plane. In one embodiment, the transfer functions may also include artifact compensation transfer functions that are generated to compensate for defective pel forming elements 165. A transfer function comprises a mapping of an input digital count (or tint) to an output digital count for a system, where digital count is the gray level or color value representing the pels in a bitmap 150 (FIG. 1).

According to one embodiment, compensation module 216 implements compensation transfer functions to adjust pel forming elements 165 proportional to its intrinsic density (e.g., uniformity) and/or adjust pel forming elements 165 adjacent to defective adjust pel forming elements 165 to ensure that defective pel forming elements 165 never eject ink, thereby ensuring that a defective pel forming element's 165 output is predictable and can be reliably compensated. In a further embodiment, pel forming elements 165 associated with the column location are determined and are disabled from operating as a part of the defect (e.g., artifact) compensation.

As mentioned above, compensation module 216 may also perform compensation using compensated halftones. Accordingly, halftone generation logic 420 may be implemented to generate compensated halftones for each color plane. In one embodiment, compensated halftones are generated by modifying the thresholds of a threshold array associated with the halftoning of each pel forming element 165 column for all drop sizes. In this embodiment, the compensated halftones include artifact compensated halftones generated by modifying (e.g., adjusting) the thresholds in specific columns adjacent to the artifact, based on the column location data. Additionally specific columns of thresholds may be modified to inhibit ejection of drops such as in the case of jet out compensation. In a further embodiment, columns extend along the web movement direction.

Inverse transfer function generation engine 430 generates inverse transfer functions that are used to generate compensated halftones. According to one embodiment, the inverse transfer functions are used (e.g., by compensation module 216) to transform thresholds in specific columns of the threshold arrays of un-compensated halftones to generate the compensated halftones. An inverse transfer function is the reversed (e.g., inverted) application of the transfer function, where the output digital count values of the transfer function form the input digital count values of the inverse transfer function and the input digital count values of the transfer function form the output digital count values of the inverse transfer function. The inverse transfer functions may be generated directly or from transfer functions by computing the mathematical inverse function of the transfer function. In one embodiment, inverse transfer functions may be received.

Figure 3B:
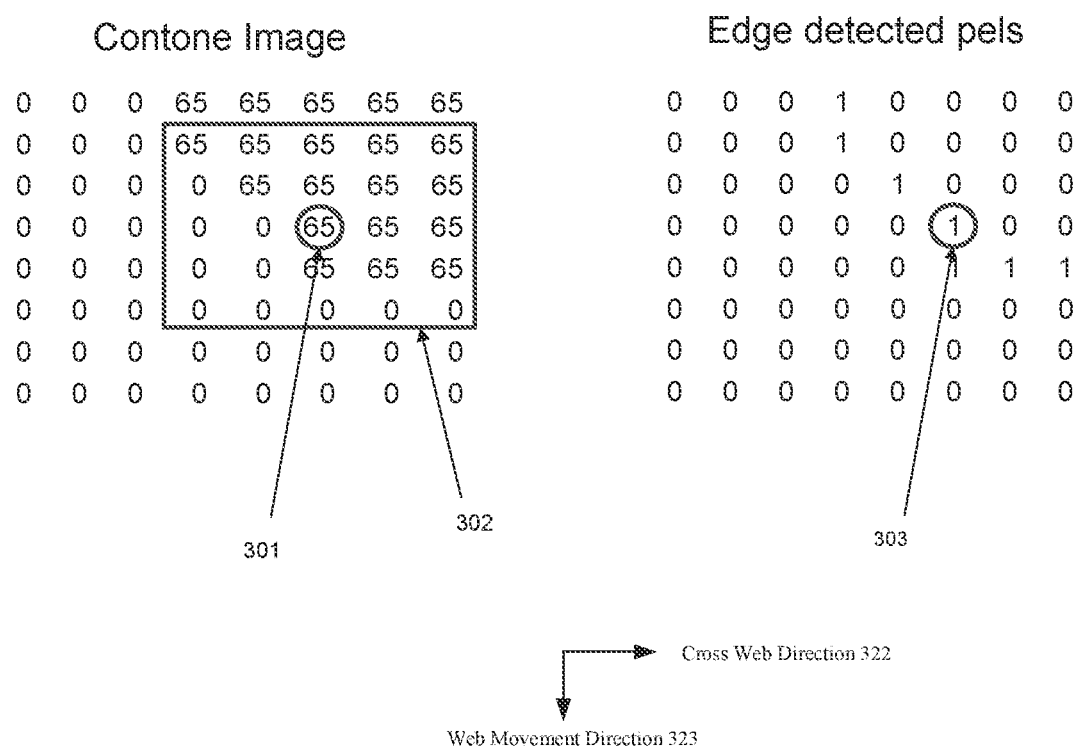
FIG. 3B illustrates one embodiment of edge detection for a contone image.

As mentioned above, edge enhancement may also be performed to enhance edge contrast of data to enhance print quality of text and images that are to be printed. In one embodiment, the first step in an edge enhancement process is to use an N×N (e.g., 5×5 when N=5) neighborhood edge detection algorithm that analyzes pels within this region to determine if a pel of interest located at the center of the N×N region is an edge pel (e.g., a pel with a non-zero contone value located next to a zero contone value pel) using pattern recognition. FIG. 3B illustrates one embodiment of an 8×8 contone image (the left array) having a pel of interest 301 (e.g., having a contone level of 65) within a 5×5 neighborhood 302. The result of the edge pel detection for this 8×8 contone image is shown in the 8×8 edge detected pels array (the right array) with array elements having logic one values where edges are detected. As shown, pel 303 includes a logical one value indicating the contone image pel of interest 301 is an edge pel for the neighborhood region 302. Cross web direction 322 indicates the direction across the web print medium in relation to the contone image, while web movement direction 323 (e.g., web path direction) indicates the print medium direction of travel in relation to the contone image. Typically, each column of the contone image corresponds to one of the pel forming elements 165.

Figure 3C:
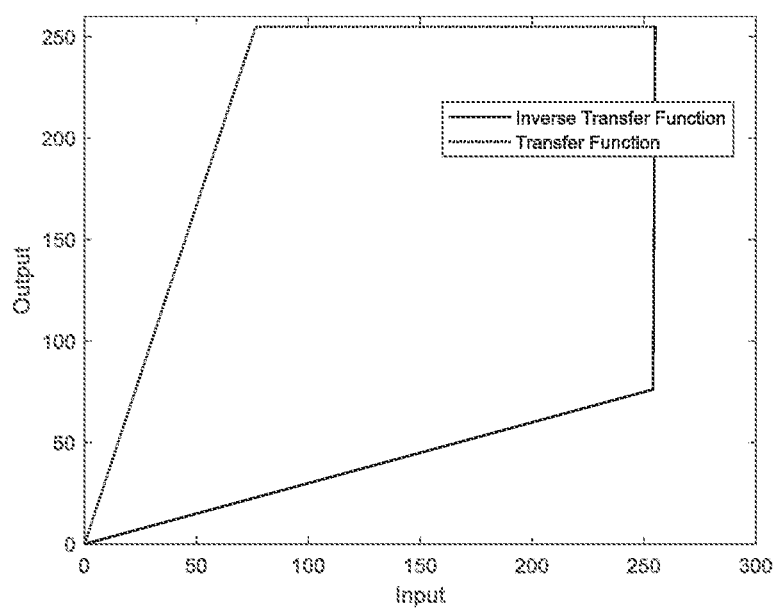
FIG. 3C illustrates one embodiment of an edge enhancement inverse transfer function.

Edge enhancement is performed on a pel of interest upon determining that is an edge pel. Edge enhancement involves applying an edge enhancement inverse transfer function (ITF) to the threshold value in a threshold array associated with a pel of interest. FIG. 3C illustrates one embodiment of an edge enhancement ITF and an edge enhancement transfer function. As shown in FIG. 3C, the edge enhancement ITF output is 0.3 times the digital count value inputs (e.g., 0.3*DC). Additionally, an exception for level 255 is added to output the placeholder threshold value for this input to ensure that placeholder thresholds remain as placeholder thresholds. In one embodiment, edge enhanced thresholds that equal the placeholder threshold correspond to no halftoned drop for the drop size corresponding to that threshold being produced for any DC level.

Placeholder thresholds are typically a value of 255. Placeholder thresholds for a given drop size inhibit a drop size from being ejected for a contone level of 255 assuming an eight bit threshold level system. In more general terms the placeholder threshold value is $2^{\wedge}bitdepth-1$ where bitdepth is the bitdepth for the halftone thresholds. The use of a placeholder value at level 255 in the ITF addresses the mathematical one to one issue when computing the inverse of a function. A mathematical requirement to generate an inverse function is that the input function must satisfy a one to one input/output relationship. The corresponding transfer function shown for this example has a number of level 255 outputs that will violate this one to one requirement because the transfer function is constant across a range of output levels. The level 255 exception modification creates the correct ITF output that is needed for halftoning. Similarly, the corresponding transfer function output is one over 0.3 times the DC (e.g., 1/1.3* DC) input with output values limited to 255.

Figure 3D:
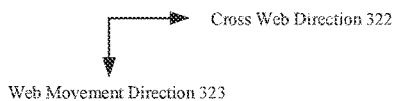
FIG. 3D illustrates one embodiment of generating an edge enhanced threshold.

FIG. 3D illustrates one embodiment of generating an edge enhanced threshold using the edge enhancement ITF and edge detected pel 304 as reference. The left array is an 8×8 edge detected pels array, the middle array is an 8×8 unmodified large drop threshold array and the right array is an 8×8 modified large drop threshold array. As shown in FIG. 3D, large drop thresholds are modified by applying an edge enhancement ITF to a threshold element 305 (e.g., threshold value=197) within a uniformity compensated threshold array. Transformation of the uniformity compensated threshold value using the edge enhancement ITF generates an edge enhanced threshold value 306 (e.g., threshold value=59).

Figure 3E:
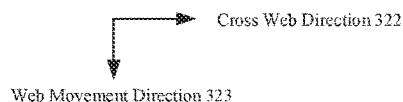
FIG. 3E illustrates one embodiment of a halftoning result.

FIG. 3E illustrates one embodiment of the halftoning results for large drops. The left array is an 8×8 contone image, the middle array is an 8×8 modified large drop threshold array and the right array is an 8×8 large drop halftoned result (where a value of 1 indicates that a large drop symbol has been determined as a result of halftoning). As shown in FIG. 3E, pel of interest 307 results in a large drop size after halftoning indicated by large drop symbol 309, using a contone level 65 defined by pel of interest 307 and threshold value 59 defined by 308; assuming halftoning equations where large drop when contone level>large drop threshold value. In one embodiment, this process is repeated for each one of the drop sizes as defined by the different planes of the threshold array to obtain edge enhanced thresholds for medium size drops and small size drops. Halftoning for each drop size using the edge enhanced thresholds produces the respective drop sizes for each plane of the threshold array. The result is a single drop size for each pel of interest employing the edge enhanced thresholds.

Figure 3F:
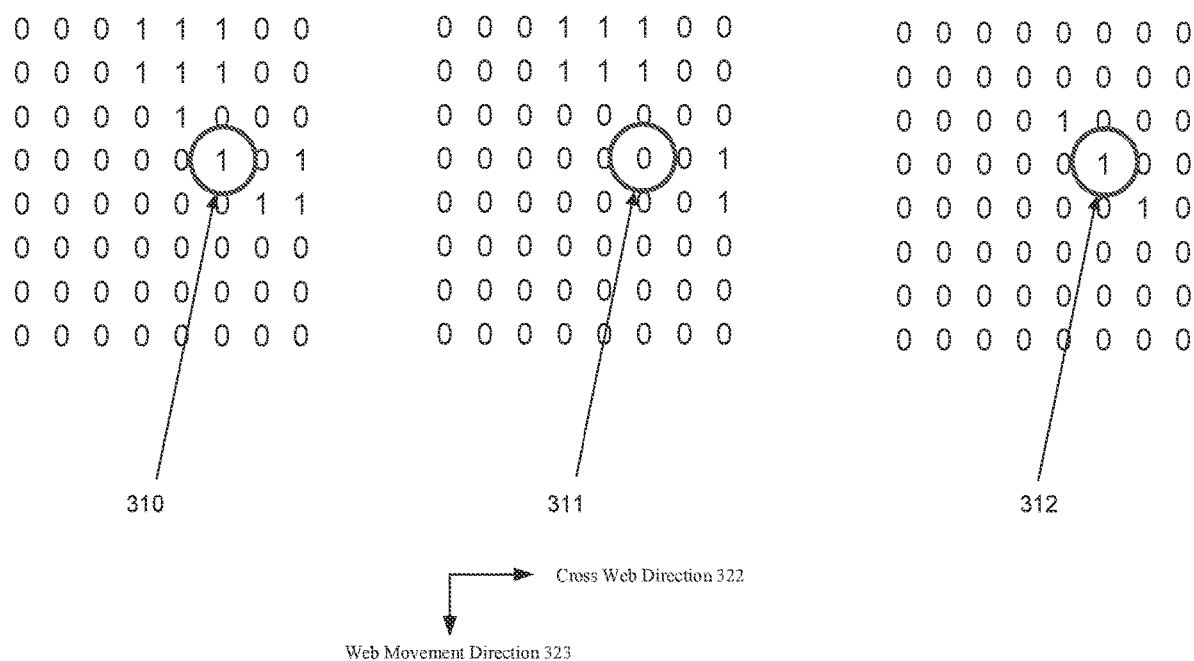
FIG. 3F illustrates one embodiment of an edge enhanced halftoning result.

FIG. 3F illustrates halftone results for large drops with and without edge enhancement. The left array is an 8×8 large drop halftone result with edge enhancement applied, the middle array is an 8×8 large drop halftone result without edge enhancement applied, and the right array is an 8×8 comparison of halftone results. Pel of interest 310 is the halftone result (e.g., large drop produced) generated from performing the above-described edge enhancement, while pel 311 shows the halftone result (e.g., large drop not produced) without edge enhancement. The differences in the halftoned results between using the edge enhancement process and not using this process is shown in corresponding pel 312, where logical one value indicates a pel having a different resulting large drop size. The results for other pels in this 8×8 example are also shown. This example illustrates how additional ink (e.g., large drops) has been added to enhance the regions identified as edges.

As is apparent, transforming the threshold using the edge enhancement ITF modifies the uniformity compensation and jet-out compensation processes performed at compensation module 216. Accordingly, an edge enhancement module 250 is included within print controller (FIG. 2) to perform edge enhancement processing.

According to one embodiment, edge enhancement module 250 receives a plurality of pels in a continuous tone image (CTI), a first halftone design associated with each of the plurality of pels, defect compensation data for pel forming elements associated with each of the plurality of pels. Subsequently, edge enhancement module 250 performs the edge enhancement processing for each of the plurality of pels. In such an embodiment, edge enhancement processing comprises generating final halftone design based on edge enhancement data associated with the pel and the defect compensation data associated with the pel. Edge enhancement processing further comprises determining whether a pel is an edge pel and generating the edge enhancement upon determining that the pel is an edge pel.

Figure 5:
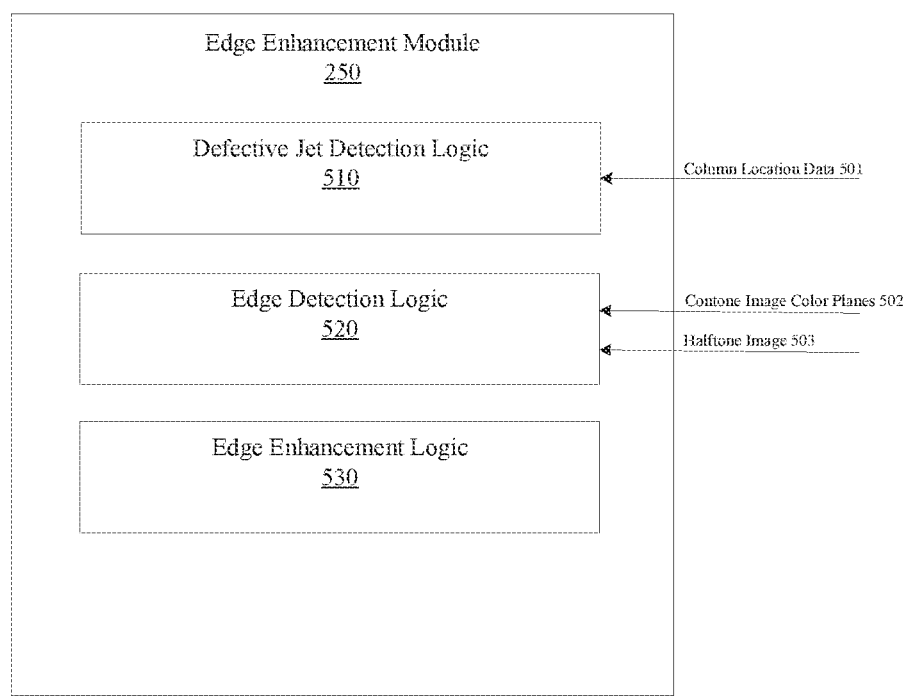
FIG. 5 illustrates one embodiment of an edge enhancement module.

FIG. 5 illustrates one embodiment of edge enhancement logic 250. As shown in FIG. 5, edge enhancement logic 250 includes defective jet detection logic 510 that receives column location data 501 that indicates the column locations at which compensation data (e.g., compensated halftones, compensation transfer functions or compensation ITFs) are to be applied to the image data. Column location data 501 may be generated by conventional means. In one embodiment, defective jet detection logic 510 uses the column location data 501 to determine associated defective pel forming elements 165. In such an embodiment, defective jet detection logic 510 determines that edge enhancement does not need to be performed for pels in columns associated with defective pel forming elements 162. In a further embodiment, column location data 501 is used by defective jet detection logic 510 during edge enhancement to determine one or more defective pel forming elements 165 adjacent to an associated image pel being examined (e.g., defective neighbor pel forming elements 165 in printheads 162), as will be discussed in more detail below.

According to one embodiment, a correspondence between the column location data 501 and the defective pel forming elements 165 is established prior to compensation being performed at compensation module 216. In such an embodiment, a measurement module 190 (FIG. 1) may be employed to obtain image data for this purpose. The location of a defective pel forming element 165 is determined by scanning a test pattern (e.g., test chart) that is printed in the margins between the sheets of printed matter or on sheets that are later discarded. The test pattern includes fiducial features having known pel forming element 165 locations. Measurements determine that an artifact exists and whether it is a deviated jet or a jet-out. Analysis determines the location of the artifact relative to the known locations of the fiducial marks. Using the scanned image defect locations and interpolating between the fiducial marks enables creation of a mapping to accurately localize the image defect to a specific nozzle location.

Referring back to FIG. 5, edge detection logic 520 receives contone image 502 and halftone image 503 and detects edge pels in each color plane of the contone image 502 (or a binary image derived from contone image 502). Edge detection logic 520 uses neighborhood processing of the contone image data on a pel-by-pel basis using a 5×5 neighborhood to detect edge pels using pattern recognition. To obtain edge detection for pels at the peripheral region of the contone image padding of the contone image is used with extra rows and columns to obtain a complete neighborhood for the pels of interest, which is because a 5×5 neighborhood when analyzing peripheral pels will extend beyond the available contone image pels. Suitable padding levels are typically contone level zero.

In one embodiment, edge enhancement logic 530 is implemented to perform edge enhancement processing for each pel in contone image 502 that is associated with an edge pel. In another embodiment, edge enhancement logic 530 facilitates generation of edge enhanced halftone designs by applying edge enhancements to threshold values in a halftone design associated with edge pels (or edge thresholds), while the threshold values not associated with edge pels (or non-edge thresholds) remain the same.

Figure 6:
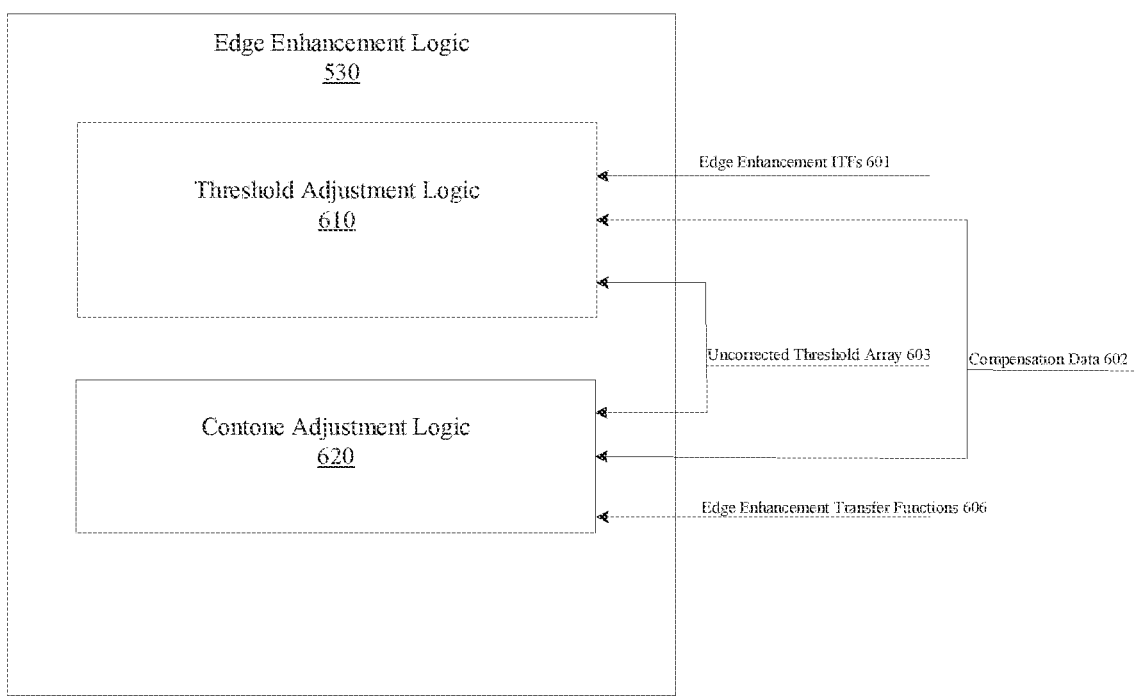
FIG. 6 illustrates one embodiment of edge enhancement logic.

According to one embodiment, edge enhancement logic 530 is also implemented to perform edge enhancement by modifying (e.g., adjusting) each edge threshold using both the edge enhancement ITF and compensation data (e.g., compensation transfer functions, compensation ITFs, or compensated threshold arrays) to generate final data (final transfer functions, final ITFs, final threshold arrays or final halftone designs) upon detecting an edge pel. FIG. 6 illustrates one embodiment of edge enhancement logic 530. As shown in FIG. 6, edge enhancement logic 530 includes threshold adjustment logic 610 and contone adjustment logic 620.

Threshold adjustment logic 610 receives edge enhancement ITFs 601 and compensation data 602 and generates final thresholds to be applied to the contone image 502 based on the edge enhancement ITFs 601 and compensation data 602. In one embodiment, the compensation data 602 may include uniformity weighting factors and/or defect compensation (e.g., defective jet compensation). Threshold adjustment logic 610 uses the uniformity weighting factors to generate final thresholds by modifying thresholds in uncompensated threshold array 603 using the edge enhancement ITFs 601 and uniformity weighting factors (or their equivalent ITFs).

In one embodiment, a uniformity weighting factor is a factor that multiplies the threshold values for a given pel to compensate for print head nozzle non-uniformities. In such an embodiment, a weighting factor is one of several factors that may contribute to an individual print head nozzle's ITF. The uniformity weighting factor is equal to the optical density at the per s contone value of the print head nozzle used to print the pel, divided by the average optical density of all print head nozzles at the pel's contone value. For example, if the nozzle used to print the pel has 105% of the average optical density of all nozzles at the pel's contone value, the uniformity-weighting factor is 1.05. To compensate the nonuniformity, the thresholds are multiplied by this factor of 1.05 before being used to halftone the pel. This multiplication yields the uniformity-compensated threshold. This method assumes a transfer function from contone values to optical densities that is linear, at least for small changes in optical density.

If a nonlinear contone-to-optical-density transfer function is in use, the ITF associated with such a transfer function may be obtained by finding the contone value at which the pel's print head nozzle would match the average optical density of all other print head nozzles at the pel's input contone value. The uniformity weighting factor in this case is given by the contone value needed to match the average density of all print head nozzles using the pel's nozzle, divided by the pel's contone value. Given the uniformity weighting factor, all possible uncompensated thresholds may be tabulated together with their uniformity-corrected thresholds for each printhead nozzle, and this table is the uniformity-corrected ITF. This ITF can transform or be transformed by other ITF's that correct other problems, such as jet-outs in adjacent pixels, or the edge enhancement ITF. The composition (e.g., successive application) of all ITF's for a given print head nozzle is the overall ITF for that nozzle. This ITF is applied to the uncompensated halftone's thresholds to produce compensated thresholds that apply uniformity correction and other desired effects, such as jet-out correction for neighboring nozzles, or edge enhancement.

Subsequently, defective jet detection logic 510 is implemented to determine when a pel is an edge pel and the pel is also associated with a neighbor defective pel forming element 165 (e.g., a defective pel forming element 165 is adjacent to a pel forming element corresponding to the pel being examined) in which case threshold adjustment logic 610 generates final thresholds by replacing uncompensated thresholds 603 for the pel with adjusted thresholds that include uniformity weighting, edge enhancement and defective neighbor pel compensation. Upon determination that the pel being examined is not associated with a neighboring defective pel forming element 165 and the pel has also been determined to be an edge pel adjustment, logic 610 generates final thresholds by replacing uncompensated thresholds 603 using special thresholds that include uniformity weighting and edge enhancement. Subsequently, the final thresholds are transmitted for halftoning the pel (e.g., at halftoning module 214) based on the contone level 502, which replaces the original halftoned drop size. The threshold adjustment logic 610 transmits the thresholds 603 modified with uniformity weighting as final thresholds for halftoning the pel upon a determination that the pel is not a neighboring defective pel forming element 162 and also is not an edge detected pel. The final threshold is transmitted to be used for halftoning based on the contone level 502.

Multiple transfer functions to be applied to a pel may be applied either serially or combined into a new single transfer function and that combined transfer function applied once. The combined transfer function may be generated as a mathematical composition of the multiple transfer functions by compensation module 216. Similarly, multiple inverse transfer functions may be applied to a threshold either serially or combined into a new single inverse transfer function and that combined inverse transfer function applied once. The combined inverse transfer function may be generated as a mathematical composition of the multiple inverse transfer functions by compensation module 216. The order of operations for multiple transfer functions or inverse transfer functions is shown below:

edgeEnhanceTF(uniformityCompTF),
    defectNeighborTF(edgeEnhanceTF(uniformity-
       CompTF)),
    edgeEnhanceITF(uniformityCompITF),
    defectNeighborITF(edgeEnhanceITF(uniformityCom-
       pITF))

Figure 7A:
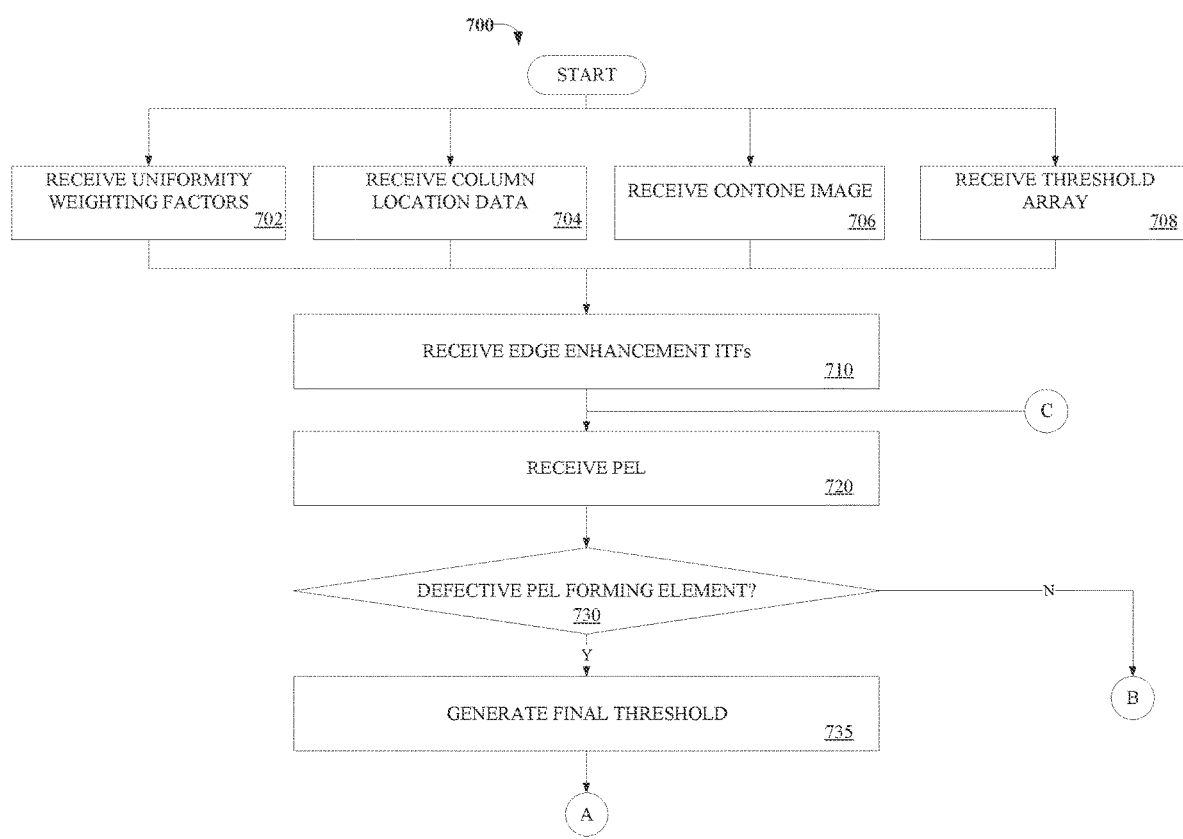
FIGS. 7A&7B is a flow diagram illustrating one embodiment of an edge enhancement process.
Figure 7B:
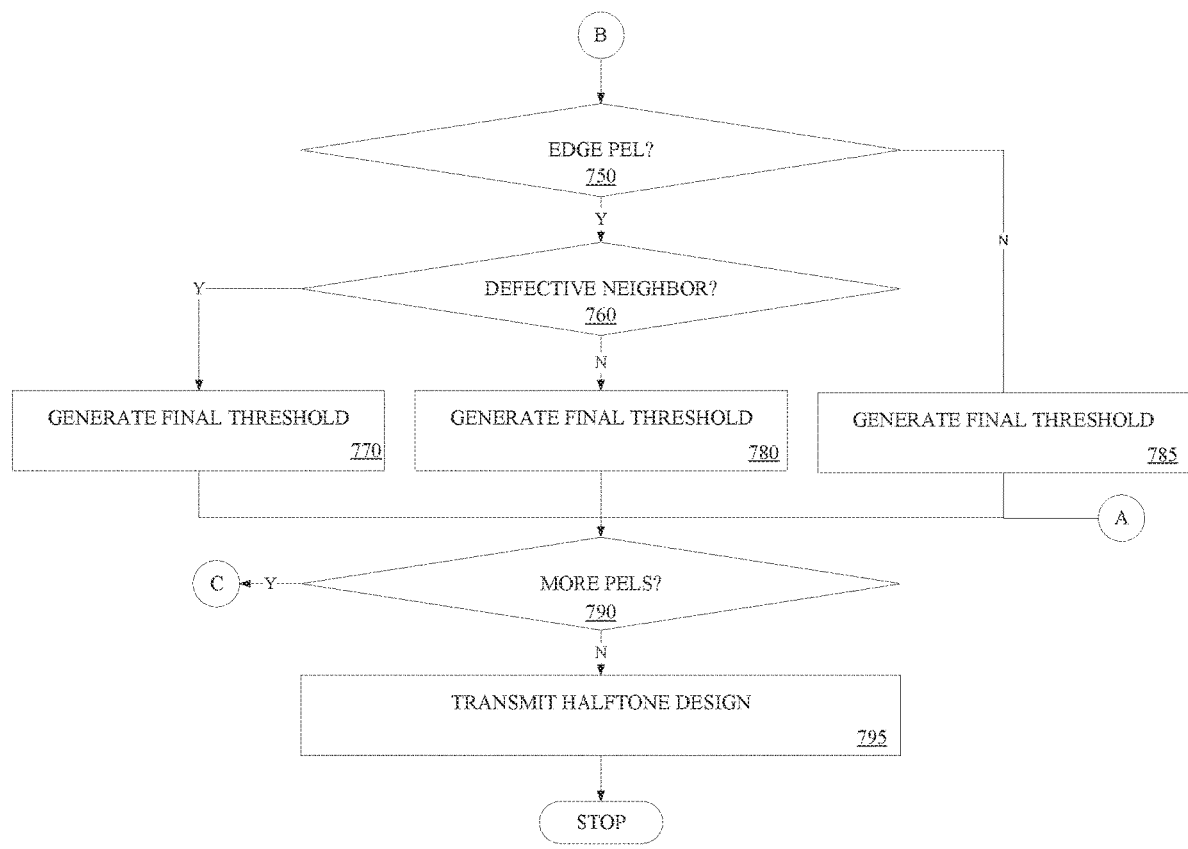

FIGS. 7A&7B are flow diagrams illustrating one embodiment of an edge enhancement process 700. Process 700 may be performed by processing logic that may include hardware (e.g., circuitry, dedicated logic, programmable logic, microcode, etc.), software such as instructions run on a processing device, or a combination thereof. In one embodiment, process 700 is performed by edge enhancement module 250. Process 700 may be performed for each color plane of the contone image 502.

Process 700 begins at processing blocks 702, 704, 706 and 708 (FIG. 7A) where uniformity weighting factors, column location data 501, contone image 502 and uncompensated threshold array 603, respectively, are received. At processing block 710, the edge enhancement ITFs are received. At processing block 720, a pel is received for edge detection. At decision block 730, a determination is made as to whether the pel is associated with a defective pel forming element 165. If a pel is associated with a defective pel forming element 165, the thresholds for all drop sizes associated with the pel are modified to a value that will cause the corresponding defective pel forming element 165 to not eject ink (e.g., the defective pel forming element 165 is disabled as a result of defective pel processing on the associated pel) are included in the final halftone design to halftone the pel of contone image 502, processing block 735. Subsequently, the process exits at A and proceeds to decision block 790 in FIG. 7B, which will be described below. One technical benefit of bypassing edge enhancement processing for a defective pel forming element 165 is improved computational efficiency since the defective pel forming element has been effectively disabled and does not require edge enhancement processing. One technical benefit of the process 700 is that the final threshold for each pel is generated based on the determined characteristics of the pel (e.g., defective, edge, and/or defective neighbor) without edge enhancement negating compensation or vice versa.

Edge detection is performed upon a determination at decision block 730 that the pel is not associated with a defective pel forming element 165. Accordingly, a determination is made as to whether the pel is an edge pel, decision block 750 (FIG. 7B). The original uncompensated threshold for the pel is modified by the uniformity weighting factors and the modified threshold is included in the final halftone design upon a determination that the pel is not an edge pel, step 785. Otherwise, a determination is made as to whether the pel is associated with a defective neighboring pel forming element 165, decision block 760.

In one embodiment a final threshold is generated by modifying the original threshold using the uniformity weighting factor, edge enhancement and defective neighbor compensation upon a determination that the pel is associated with a defective neighbor pel forming element 165, processing block 770. Defective neighbor compensation may be defective neighbor inverse transfer functions or defective neighbor transfer functions that are used to adjust defect neighbor pel forming elements by increasing ink output to compensate for neighboring defective pel forming elements. Defective neighbor compensation may be received by compensation module 216. The generated final threshold is included in the final halftone design to be used for halftoning the pel to determine the final drop size. Subsequently, a determination is made as to whether there are additional pels to process, decision block 790.

Upon a determination at decision block 760 that the pel is not associated with a defective neighboring pel forming element 165, a final threshold is generated by modifying the original threshold using the uniformity weighting factor and edge enhancement, processing block 780. At decision block 790, a determination is made as to whether there are additional pels to process. If not, the final thresholds for each pel or final halftone design are transmitted, at processing block 795, and process 700 has been completed. Otherwise, control is returned to processing block 720 (FIG. 7A) where another pel is received. Note that the final halftone design comprises the set of final thresholds for each pel.

Referring back to FIG. 6, threshold adjustment logic 610 may generate final thresholds using ITFs. In this embodiment, threshold adjustment logic 610 receives a set of uniformity and jet-out compensation ITFs, one for each column x, as compensation data 602 corresponding to each of a plurality of pel forming elements 165 along with edge enhancement ITFs 601 (edgeEnhanceITF). In addition, the uncompensated threshold array 603 (ThresholdArray(x',y', k), where k=drop size) is provided. As used herein, the terms compensated (or corrected) refers to pels, threshold values or halftones on which compensation (e.g., uniformity compensation and/or defective jet compensation) has been performed (e.g., at compensation module 216). As used herein, the terms compensation (or correction) refer to transfer functions or ITFs that are used to apply the compensation. Furthermore, edge enhancement refers to modifications made to corresponding edge detected pel thresholds or contone levels using a ITF or TF.

Threshold adjustment logic 610 generates the final thresholds, upon an edge pel being detected, by using the ITF compensation data (e.g., compensation ITFs) and the edge enhancement ITFs 601 to modify thresholds in the uncompensated threshold array 603 for each of a plurality of colors. As a result, the final threshold data may be represented as follows, where this modification is applied for each drop size k:

$$\text{modifiedThresholds2}(x',y',k)=\text{edgeEnhanceITF}(\text{Uniformity},\text{JOCompensatedITF}(x',\text{ThresholdArray}(x',y',k))),$$

where $x',y'$=Threshold Array domain coordinates, and k is the index for drop sizes.

In a further embodiment, threshold adjustment logic 610 generates final thresholds upon determining that the examined pel is not an edge pel. In this embodiment, the final thresholds are generated using the ITF compensation data for the respective column x' to modify thresholds in the uncompensated threshold array 603 for each of a plurality of colors and drop sizes, such that:

$$\text{modifiedThresholds1}(x',y',k)=\text{Uniformity},\text{JOCompensatedITF}(x',\text{ThresholdArray}(x',y',k))$$

Also in this embodiment, column location data 501 does not need to be examined by defective jet detection logic 510 since the compensation ITFs, which are unique for each column x, include disabling of defective pel forming elements 165 by transforming thresholds to the placeholder value as described previously. One technical benefit of disabling defective pel forming elements 165 is preventing the defective pel forming elements 165 from unexpectedly ejecting ink as may happen if the defective state is intermittent. Using the edge enhancement ITF to modify the edge thresholds provides a well-controlled change for edge enhancement pels that darkens edge pixels, relative to the original compensation ITF. Additionally, using ITFs enables the generated edge enhanced thresholds to be tailored to provide a wide range of pel darkening that maintains the limits in the ITF. In yet a further embodiment, edge pels may be lightened to reduce ink deposit for the edge pels. Such an adjustment may be useful for cases of improving barcode readability.

Figure 8:
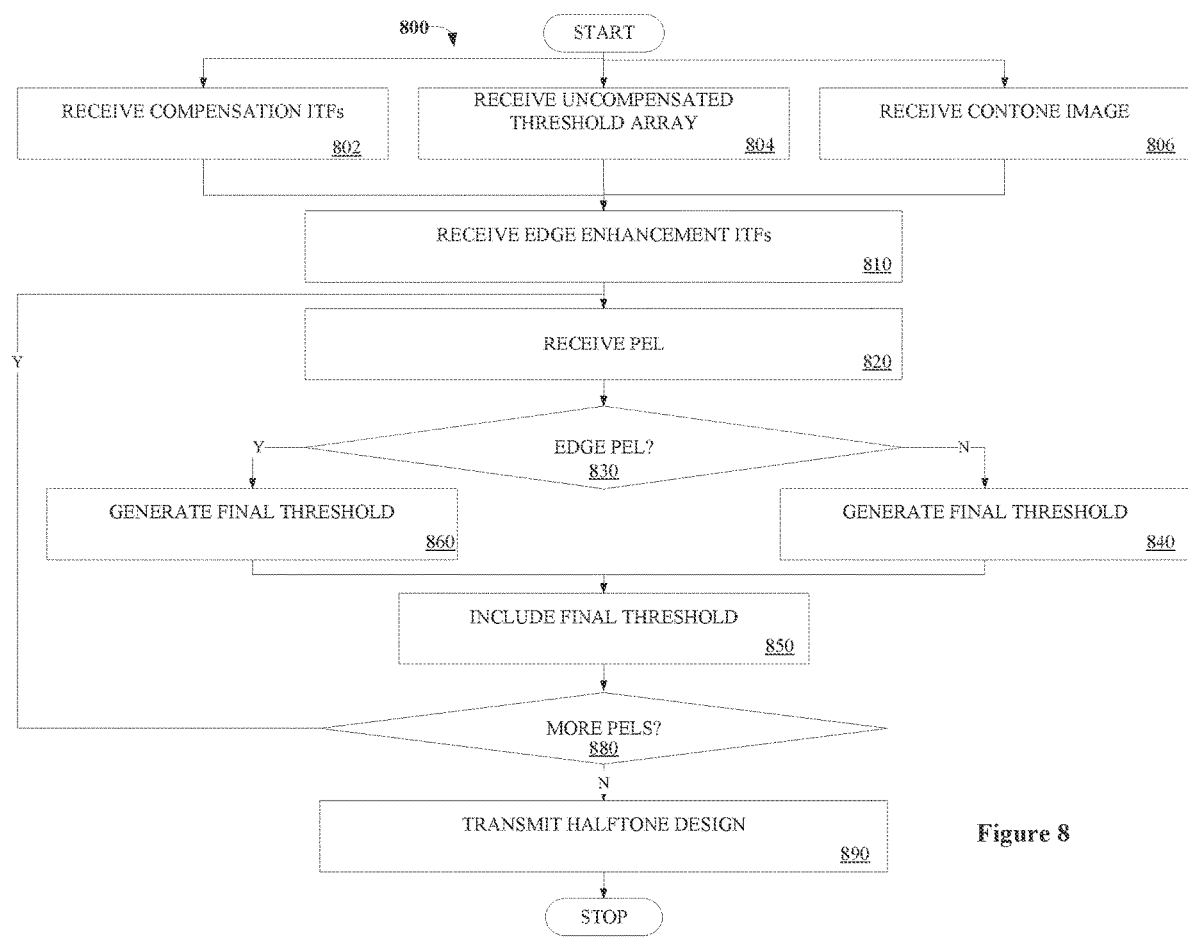
FIG. 8 is a flow diagram illustrating another embodiment of an edge enhancement process.

FIG. 8 is a flow diagram illustrating one embodiment of an edge enhancement process 800. Process 800 may be performed by processing logic that may include hardware (e.g., circuitry, dedicated logic, programmable logic, microcode, etc.), software such as instructions run on a processing device, or a combination thereof. In one embodiment, process 800 is performed by edge enhancement module 250. Process 800 may be performed for each color plane of the contone image 502 and for every drop size defined by the thresholds.

Process 800 begins at processing blocks 802, 804 and 806 where compensation ITFs, the uncompensated threshold array 603, and the contone image 502, respectively, are received. The compensation ITFs include uniformity and defective jet compensations, but do not include any edge enhancement. The uncompensated threshold array does not include uniformity compensation, defective jet compensation, nor edge enhancement. At processing block 810, the edge enhancement ITFs 601 are received. At processing block 820, a pel is received. At decision block 830, edge detection is performed by determining whether the pel is an edge pel. If the pel is not an edge pel, a final threshold is generated using a compensation ITF to modify an associated threshold in the uncompensated threshold array 603, processing block 840. At processing block 850, the final threshold is included in the final halftone design to be used for halftoning the pel.

Upon a determination at decision block 830 that the pel is an edge pel, a final threshold is generated using a compensation ITF and an edge enhancement ITF 601 to modify a corresponding threshold in the uncompensated threshold array 603, processing block 860. Control is again forwarded to processing block 850, the final threshold is included in the final halftone design to be used for halftoning the pel. At decision block 880, a determination is made as to whether there are additional pels to process. If not, the final halftone design is transmitted, processing block 890, and process 800 has been completed. Otherwise, control is returned to processing block 820 where another pel is received.

In an alternative embodiment, threshold adjustment logic 610 (FIG. 6) may generate the edge enhancement thresholds using a compensated threshold array (uniformityJO compensated ThresholdArray (x',y',k) as the compensation data 602 for each of the plurality of pel forming elements 165. In this embodiment, threshold adjustment logic 610 generates the final thresholds, upon an edge pel being detected, by using the edge enhancement ITFs 601 to modify thresholds in the compensated threshold array for each of a plurality of colors. As a result, the edge enhancement data may be represented as follows:

modifiedThresholds(x',y',k)=edgeEnhanceITF(uniformity,JOCompensatedThresholdArray (x',y',k)).

Threshold adjustment logic 610 includes the unmodified compensated thresholds in the compensated threshold array upon determining that an examined pel is not an edge pel since the compensated threshold array already includes the ideal compensations for the pel forming element 165, including placeholder thresholds that prevent any drops from firing due to the pel forming element 165 being defective.

Figure 9:
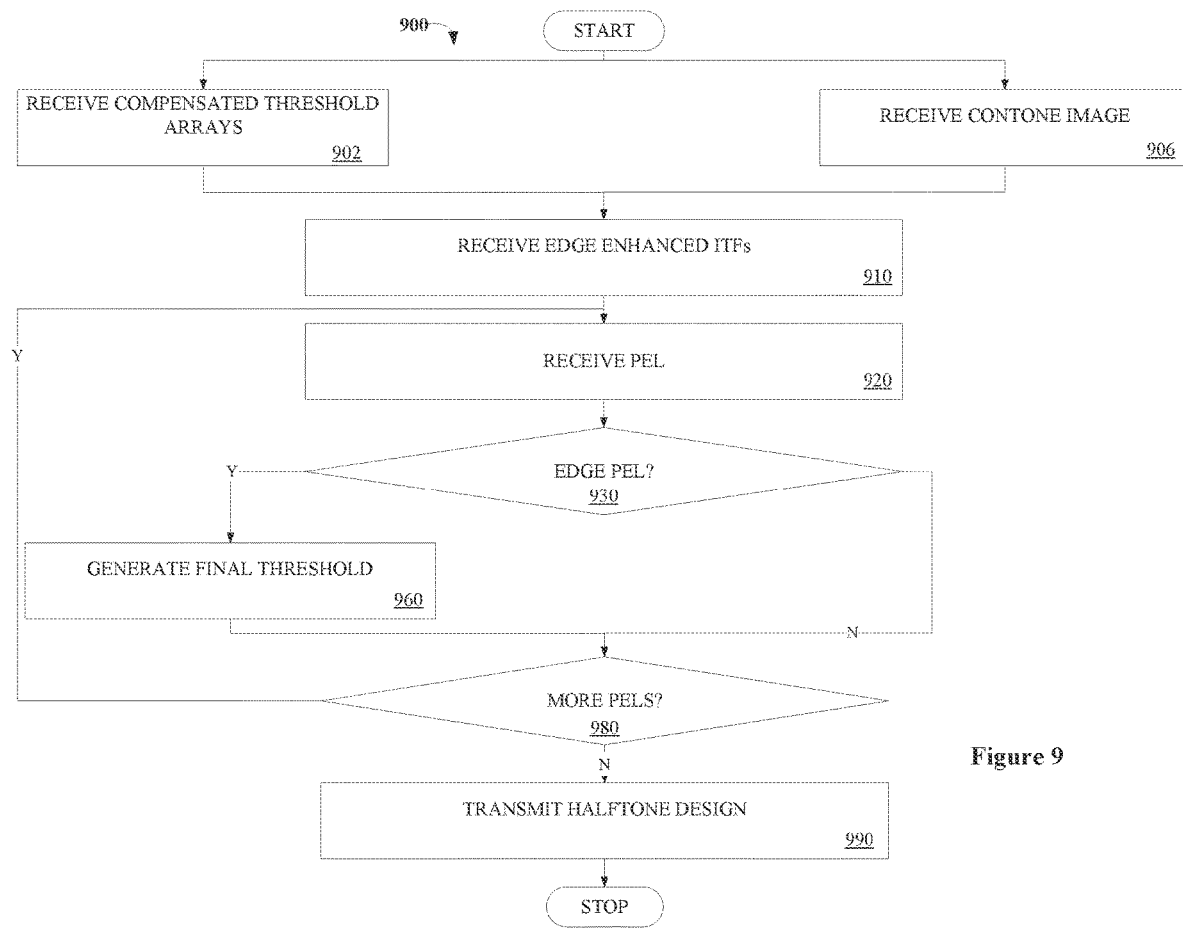
FIG. 9 is a flow diagram illustrating yet another embodiment of an edge enhancement process.

FIG. 9 is a flow diagram illustrating one embodiment of an edge enhancement process 900. Process 900 may be performed by processing logic that may include hardware (e.g., circuitry, dedicated logic, programmable logic, microcode, etc.), software such as instructions run on a processing device, or a combination thereof. In one embodiment, process 900 is performed by edge enhancement module 250. Process 900 may be performed for each color plane of the contone image 502 and for every drop size in the final threshold array.

Process 900 begins at processing blocks 902 and 906 where a compensated threshold array and the contone image 502, respectively, are received. Where for example the compensated threshold array includes uniformity and defective jet compensations, but does not include any edge enhancement. At processing block 910, the edge enhancement ITFs 601 are received. At processing block 920, a pel is received. At decision block 930, edge detection is performed by determining whether the pel is an edge pel. If not, a threshold in the compensated threshold array is to be used for halftoning the pel. Subsequently, control is forwarded to decision block 980, which will be discussed below.

Upon a determination at decision block 930 that the pel is an edge pel, a final threshold is generated using the edge enhancement ITFs 601 to modify the corresponding threshold in the compensated threshold array, processing block 960. The generated edge enhanced threshold is used to replace the corresponding threshold in the compensated threshold array to be used for halftoning the pel. Therefore the compensated threshold array for a compensated halftone design that is used for halftoning includes edge enhanced thresholds that have been modified or thresholds that remain the same based on edge detection. Subsequently, control is forwarded to decision block 980. At decision block 980, a determination is made as to whether there are additional pels to process. If not, the final thresholds or final halftone design is transmitted, processing block 990, and process 900 has been completed. Otherwise, control is returned to processing block 920 where another pel is received.

Referring back to FIG. 6, edge enhancement logic 530 also includes contone adjustment logic 620 that may be implemented to generate modified image pels, rather than generating modified thresholds. In this embodiment, transfer functions are employed that include uniformity and defective jet compensation to achieve the ideal compensations. Accordingly, threshold adjustment logic 610 receives compensation transfer functions (e.g., uniformity_JO TF(x,DC)) for each of the plurality of pel forming elements 165 associated with image column x as compensation data 602, and uncompensated threshold array 603. The transfer functions 602 form a set of transfer functions, one for each image column x, that transforms digital count contone levels DC. Defective pel elements 165 have been disabled in the transfer functions (e.g., using zero level output values for all input levels DC in the transfer function or otherwise disabling the defective pel forming element).

In a further embodiment, a further modification to the transfer function compensation data 602 is performed using edge enhancement transfer functions 606 for pels that have been identified by the edge enhancement algorithm. In response, contone adjustment logic 620 generates the modified pels (e.g., the modified contone level of the pels) by applying the compensation transfer functions and the edge enhancement transfer functions 606 to modify the contone image pel for each of the plurality of colors upon detection of an edge pel. As a result, the modified contone image at pel x,y may be represented as follows:

modified contone image(x,y) pel=edgeEnhanceTF ((uniformity_JO TF(x,contone(x,y)))

Assuming the contone image level for pel x,y without modification is contone(x,y), uniformity_JO TF(x,DC) is the uniformity jet-out compensated TF for pel x and edgeEnhanceTF(DC) is the TF applied to edge detected pels. Subsequently, the edge enhanced image pels are transmitted for halftoning. In such an embodiment, since the enhancement has occurred by modifying the contone levels the halftone drop sizes for edge enhanced image pels are obtained by halftoning using the uncompensated threshold array 603.

In one embodiment, contone adjustment logic 620 also generates compensated pels upon determining that the examined pel is not an edge pel. In this embodiment, the compensated pels are generated by applying the compensation transfer function (e.g., compensation data 602) to the contone image 502 pels, such that:

modified contone image(x,y) pixel=uniformity_JO TF(x,contone(x,y)).

The compensated pels are also transmitted for halftoning using the uncompensated threshold array 603.

Figure 10:
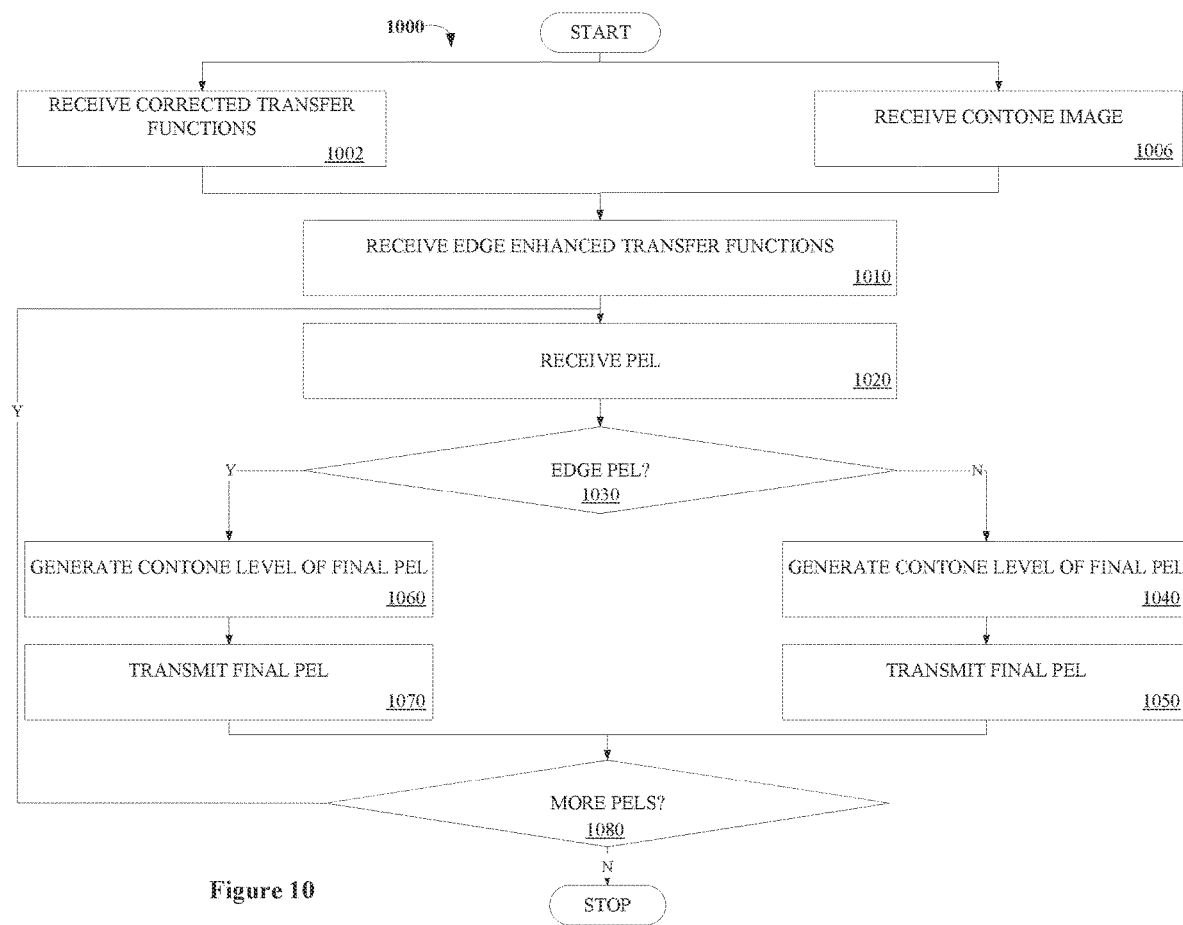
FIG. 10 is a flow diagram illustrating still another embodiment of an edge enhancement process.

FIG. 10 is a flow diagram illustrating one embodiment of an edge enhancement process 1000. Process 1000 may be performed by processing logic that may include hardware (e.g., circuitry, dedicated logic, programmable logic, microcode, etc.), software such as instructions run on a processing device, or a combination thereof. Process 1000 may be performed for each color plane of the contone image 502. In one embodiment, process 1000 is performed by edge enhancement module 250.

Process 1000 begins at processing blocks 1002 and 1006 where compensation (e.g., corrected) transfer functions (e.g., compensation data 602), and the contone image 502, respectively, are received. At processing block 1010, the edge enhancement transfer functions 606 are received. At processing block 1020, a pel is received. At decision block 1030, edge detection is performed by determining whether the pel is an edge pel. The contone level of a final pel is generated by applying the associated compensation transfer function to a corresponding pel in the contone image 502 upon determining that the pel is not an edge pel, processing block 1040. At processing block 1050, the final pel is transmitted to be used for halftoning the pel. Subsequently, control is forwarded to decision block 1080, which will be discussed below.

Upon a determination at decision block 1030 that the pel is an edge pel, the contone level of a final pel is generated by applying the associated compensation transfer function and an edge enhancement transfer function 606 to a corresponding pel in the contone image 502, processing block 1060. At processing block 1070, the final pel is transmitted for halftoning the pel. Subsequently, control is forwarded to decision block 1080. At decision block 1080, a determination is made as to whether there are additional pels to process. If not, process 1000 has been completed. Otherwise, control is returned to processing block 1020 where another pel is received.

One technical benefit of modifying halftone designs (e.g., halftone threshold array thresholds) with inverse transfer functions is improved computational efficiency versus other methods. This is because the ITF's for uniformity compensation and jet-out correction can be pre-applied to the uncompensated halftone, whereas the edge enhancement ITF is only applied in the case of edge pixels. As shown above, applying inverse transfer functions requires access to the halftone designs while applying transfer functions does not require access to the halftone designs. Therefore, in embodiments where the halftone designs are not available to the edge enhancement logic, transfer functions may be used.

Figure 11:
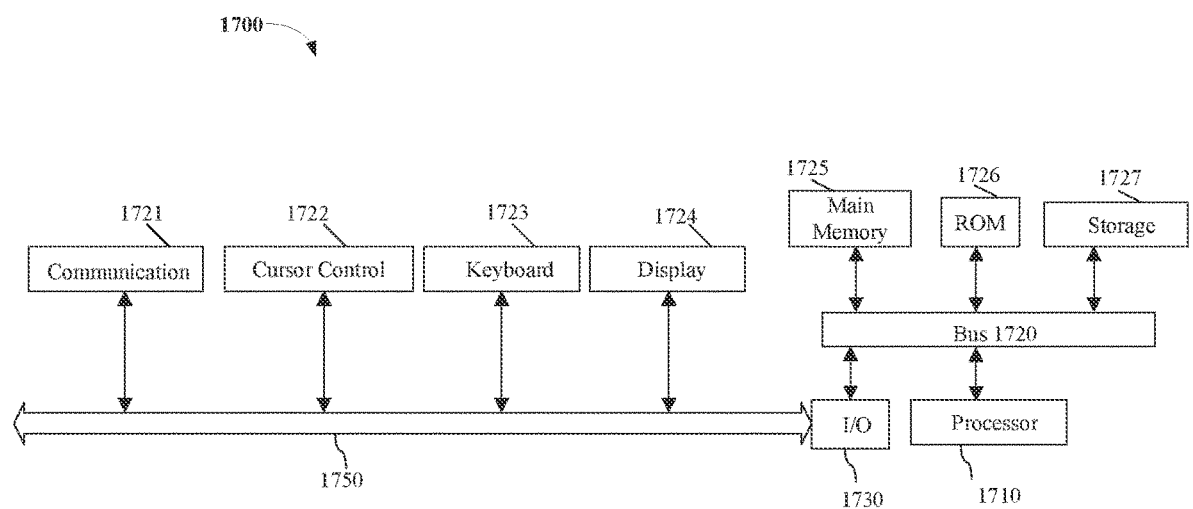
FIG. 11 illustrates one embodiment of a computer system.

FIG. 11 illustrates a computer system 1700 on which printing system 130 and/or compensation module 216 may be implemented. Computer system 1700 includes a system bus 1720 for communicating information, and a processor 1710 coupled to bus 1720 for processing information.

Computer system 1700 further comprises a random-access memory (RAM) or other dynamic storage device 1725 (referred to herein as main memory), coupled to bus 1720 for storing information and instructions to be executed by processor 1710. Main memory 1725 also may be used for storing temporary variables or other intermediate information during execution of instructions by processor 1710. Computer system 1700 also may include a read only memory (ROM) and or other static storage device 1726 coupled to bus 1720 for storing static information and instructions used by processor 1710.

A data storage device 1727 such as a magnetic disk or optical disc and its corresponding drive may also be coupled to computer system 1700 for storing information and instructions. Computer system 1700 can also be coupled to a second I/O bus 1750 via an I/O interface 1730. A plurality of I/O devices may be coupled to I/O bus 1750, including a display device 1724, an input device (e.g., an alphanumeric input device 1723 and or a cursor control device 1722). The communication device 1721 is for accessing other computers (servers or clients). The communication device 1721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store edge enhancement logic and one or more processors coupled with the at least one physical memory device to execute the edge enhancement logic to receive a plurality of pels in a continuous tone image (CTI), receive compensation data for pel forming elements associated with each of the plurality of pels, receive edge enhancement transfer functions, determine whether each of the plurality of pels is an edge pel, perform edge enhancement processing for each of the determined edge pels, including generating a final pel value for the pel based on the pel value for the pel, the edge enhancement transfer function associated with the pel, and the compensation data associated with the pel and perform compensation processing for each of the determined not edge pels, including generating a final pel value for the pel based on the pel value for the pel, and the compensation data associated with the pel.

Example 2 includes the subject matter of Example 1, wherein a transfer function comprises a mapping of an input digital count to an output digital count of a print system.

Example 3 includes the subject matter of Examples 1 and 2, wherein the final pel value for each of the determined edge pels is generated by modifying the pel value of each of the determined edge pels by applying a corresponding edge enhancement transfer function and a compensation transfer function.

Example 4 includes the subject matter of Examples 1-3, wherein performing the edge enhancement processing further comprises determining whether each of the determined edge pels is associated with a neighboring defective pel forming element, and further modifying the pel value of the determined neighboring defective edge pels with defective neighbor compensation.

Example 5 includes the subject matter of Examples 1-4, wherein the edge enhancement logic further determines that one or more of the plurality of pel forming elements are defective and bypasses the edge enhancement processing of a pel associated with the one or more defective pel forming elements to perform defective pel processing on the associated pel.

Example 6 includes the subject matter of Examples 1-5, wherein the compensation data comprises a plurality of compensation transfer functions associated with each of the plurality of pels.

Example 7 includes the subject matter of Examples 1-6, wherein the at least one physical memory device further to store halftoning logic and the one or more processors execute the halftoning logic to perform a halftoning operation on the final pel values.

Example 8 includes the subject matter of Examples 1-7, further comprising a print engine to print the output image.

Some embodiments pertain to Example 9 that includes at least one computer readable medium having instructions stored thereon, which when executed by one or more processors, cause the processors to receive a plurality of pels in a continuous tone image (CTI), receive compensation data for pel forming elements associated with each of the plurality of pels, receive edge enhancement transfer functions, determine whether each of the plurality of pels is an edge pel, perform edge enhancement processing for each of the determined edge pels, including generating a final pel value for the pel based on the pel value for the pel, the edge enhancement transfer function associated with the pel, and the compensation data associated with the pel and perform compensation processing for each of the determined not edge pels, including generating a final pel value for the pel based on the pel value for the pel, and the compensation data associated with the pel.

Example 10 includes the subject matter of Example 9, wherein a transfer function comprises a mapping of an input digital count to an output digital count of a print system.

Example 11 includes the subject matter of Examples 9 and 10, wherein the final pel value for each of the determined edge pels is generated by modifying the pel value of each of the determined edge pels by applying a corresponding edge enhancement transfer function and a compensation transfer function.

Example 12 includes the subject matter of Examples 9-11, wherein performing the edge enhancement processing further comprises determining whether each of the determined edge pels is associated with a neighboring defective pel forming element, and further modifying the pel value of the determined neighboring defective edge pels with defective neighbor compensation.

Example 13 includes the subject matter of Examples 9-12, having instructions stored thereon, which when executed by one or more processors, further cause the processors to determine that one or more of the plurality of pel forming elements are defective and bypass the edge enhancement processing of a pel associated with the one or more defective pel forming elements to perform defective pel processing on the associated pel.

Example 14 includes the subject matter of Examples 9-13, wherein the compensation data comprises a plurality of compensation transfer functions associated with each of the plurality of pels.

Some embodiments pertain to Example 15 that includes a method comprising receiving a plurality of pels in a continuous tone image (CTI), receiving compensation data for pel forming elements associated with each of the plurality of pels, receiving edge enhancement transfer functions, determining whether each of the plurality of pels is an edge pel, performing edge enhancement processing for each of the determined edge pels, including generating a final pel value for the pel based on the pel value for the pel, the edge enhancement transfer function associated with the pel, and the compensation data associated with the pel and performing compensation processing for each of the determined not edge pels, including generating a final pel value for the pel based on the pel value for the pel, and the compensation data associated with the pel.

Example 16 includes the subject matter of Example 15, wherein a transfer function comprises a mapping of an input digital count to an output digital count of a print system.

Example 17 includes the subject matter of Examples 15 and 16, wherein the final pel value for each of the determined edge pels is generated by modifying the pel value of each of the determined edge pels by applying a corresponding edge enhancement transfer function and a compensation transfer function.

Example 18 includes the subject matter of Examples 15-17, wherein performing the edge enhancement processing further comprises determining whether each of the determined edge pels is associated with a neighboring defective pel forming element, and further modifying the pel value of the determined neighboring defective edge pels with defective neighbor compensation.

Example 19 includes the subject matter of Examples 15-18, further comprising determining that one or more of the plurality of pel forming elements are defective and bypassing the edge enhancement processing of a pel associated with the one or more defective pel forming elements to perform defective pel processing on the associated pel.

Example 20 includes the subject matter of Examples 15-19, wherein the compensation data comprises a plurality of compensation transfer functions associated with each of the plurality of pels.

What is claimed is:

1. A system comprising:
   at least one physical memory device to store edge enhancement logic; and
   one or more processors coupled with the at least one physical memory device to execute the edge enhancement logic to:
   receive a plurality of pels in a continuous tone image (CTI);
   receive compensation data for pel forming elements associated with each of the plurality of pels;
   receive edge enhancement transfer functions;
   determine whether each of the plurality of pels is an edge pel;
   perform edge enhancement processing for each of the determined edge pels, including generating a final pel value for the pel based on the pel value for the pel, the edge enhancement transfer function associated with the pel, and the compensation data associated with the pel; and
   perform compensation processing for each of the determined not edge pels, including generating the final pel value for the pel based on the pel value for the pel, and the compensation data associated with the pel.

2. The system of claim 1, wherein a transfer function comprises a mapping of an input digital count to an output digital count of a print system.

3. The system of claim 1, wherein the final pel value for each of the determined edge pels is generated by modifying the pel value of each of the determined edge pels by applying a corresponding edge enhancement transfer function and a compensation transfer function.

4. The system of claim 1, wherein performing the edge enhancement processing further comprises determining whether each of the determined edge pels is associated with a neighboring defective pel forming element, and further modifying the pel value of the determined neighboring defective edge pels with defective neighbor compensation.

5. The system of claim 1, wherein the edge enhancement logic further determines that one or more of the plurality of pel forming elements are defective and bypasses the edge enhancement processing of a pel associated with the one or more defective pel forming elements to perform defective pel processing on the associated pel.

6. The system of claim 1, wherein the compensation data comprises a plurality of compensation transfer functions associated with each of the plurality of pels.

7. The system of claim 1, wherein the at least one physical memory device further to store halftoning logic and the one or more processors execute the halftoning logic to perform a halftoning operation on the final pel values.

8. The system of claim 1, further comprising a print engine to print an output image.

9. At least one non-transitory computer readable medium having instructions stored thereon, which when executed by one or more processors, cause the processors to:
receive a plurality of pels in a continuous tone image (CTI);
receive compensation data for pel forming elements associated with each of the plurality of pels;
receive edge enhancement transfer functions;
determine whether each of the plurality of pels is an edge pel;
perform edge enhancement processing for each of the determined edge pels, including generating a final pel value for the pel based on the pel value for the pel, the edge enhancement transfer function associated with the pel, and the compensation data associated with the pel; and
perform compensation processing for each of the determined not edge pels, including generating the final pel value for the pel based on the pel value for the pel, and the compensation data associated with the pel.

10. The non-transitory computer readable medium of claim 9, wherein a transfer function comprises a mapping of an input digital count to an output digital count of a print system.

11. The non-transitory computer readable medium of claim 9, wherein the final pel value for each of the determined edge pels is generated by modifying the pel value of each of the determined edge pels by applying a corresponding edge enhancement transfer function and a compensation transfer function.

12. The non-transitory computer readable medium of claim 9, wherein performing the edge enhancement processing further comprises determining whether each of the determined edge pels is associated with a neighboring defective pel forming element, and further modifying the pel value of the determined neighboring defective edge pels with defective neighbor compensation.

13. The non-transitory computer readable medium of claim 9, having instructions stored thereon, which when executed by one or more processors, further cause the processors to: determine that one or more of the plurality of pel forming elements are defective; and bypass the edge enhancement processing of a pel associated with the one or more defective pel forming elements to perform defective pel processing on the associated pel.

14. The non-transitory computer readable medium of claim 9, wherein the compensation data comprises a plurality of compensation transfer functions associated with each of the plurality of pels.

15. A method comprising:
receiving a plurality of pels in a continuous tone image (CTI);
receiving compensation data for pel forming elements associated with each of the plurality of pels;
receiving edge enhancement transfer functions;
determining whether each of the plurality of pels is an edge pel;
performing edge enhancement processing for each of the determined edge pels, including generating a final pel value for the pel based on the pel value for the pel, the edge enhancement transfer function associated with the pel, and the compensation data associated with the pel; and
performing compensation processing for each of the determined not edge pels, including generating the final pel value for the pel based on the pel value for the pel, and the compensation data associated with the pel.

16. The method of claim 15, wherein a transfer function comprises a mapping of an input digital count to an output digital count of a print system.

17. The method of claim 15, wherein the final pel value for each of the determined edge pels is generated by modifying the pel value of each of the determined edge pels by applying a corresponding edge enhancement transfer function and a compensation transfer function.

18. The method of claim 15, wherein performing the edge enhancement processing further comprises determining whether each of the determined edge pels is associated with a neighboring defective pel forming element, and further modifying the pel value of the determined neighboring defective edge pels with defective neighbor compensation.

19. The method of claim 15, further comprising:
determining that one or more of the plurality of pel forming elements are defective; and
bypassing the edge enhancement processing of a pel associated with the one or more defective pel forming elements to perform defective pel processing on the associated pel.

20. The method of claim 15, wherein the compensation data comprises a plurality of compensation transfer functions associated with each of the plurality of pels.

* * * * *